Figure 1:
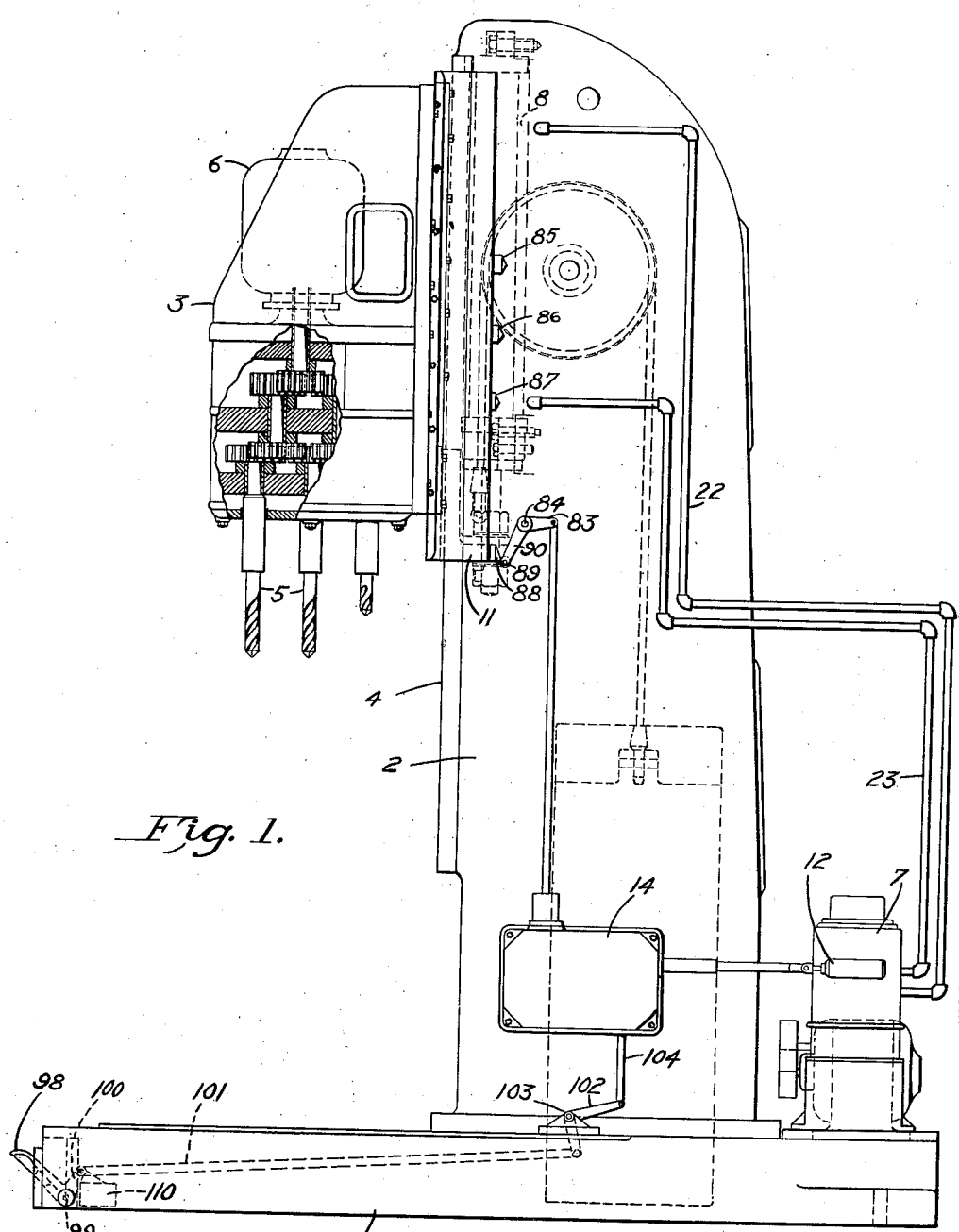

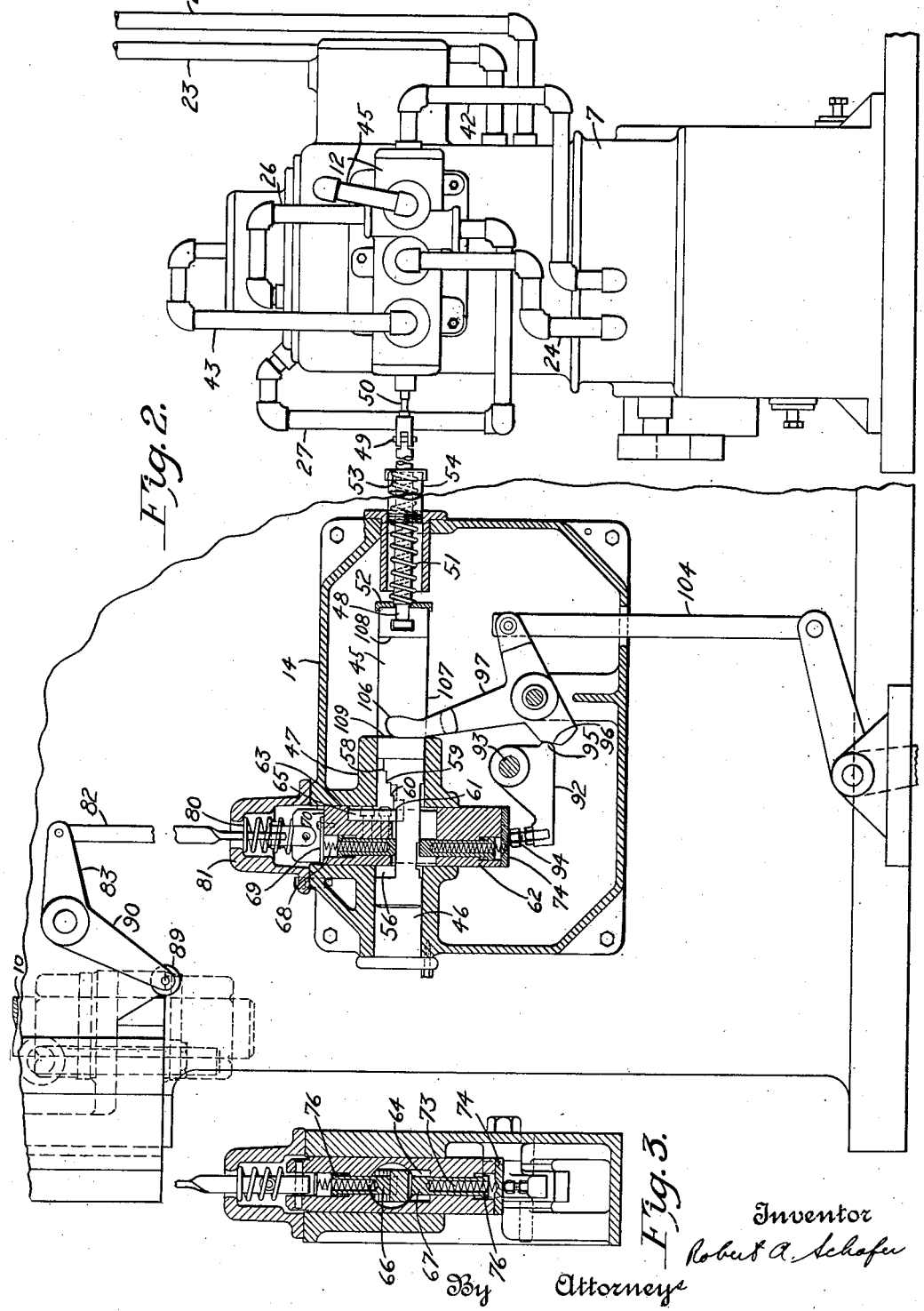

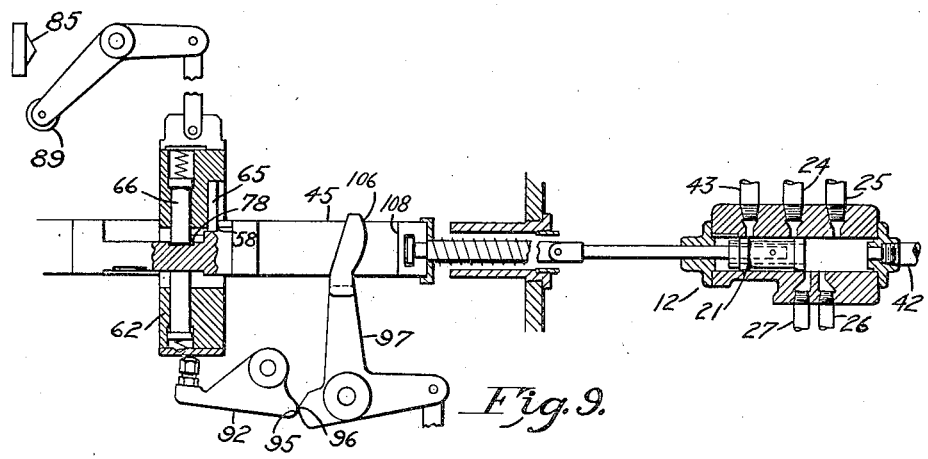
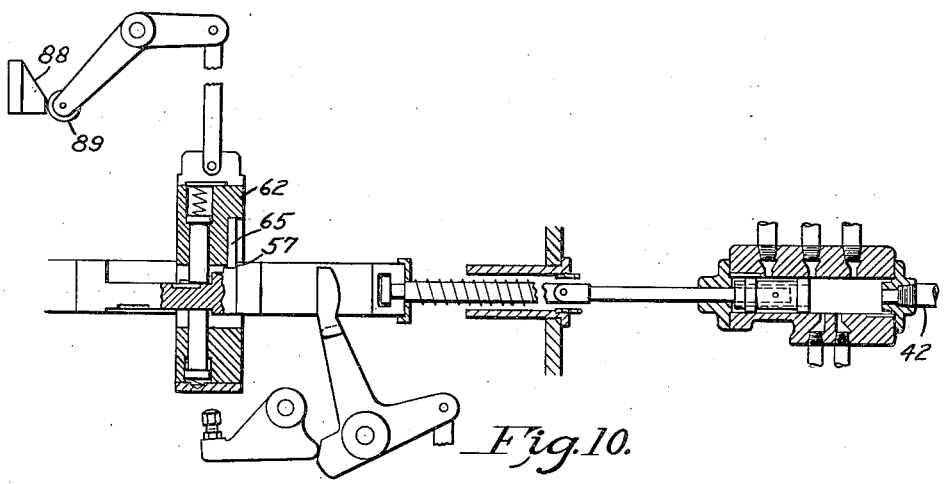
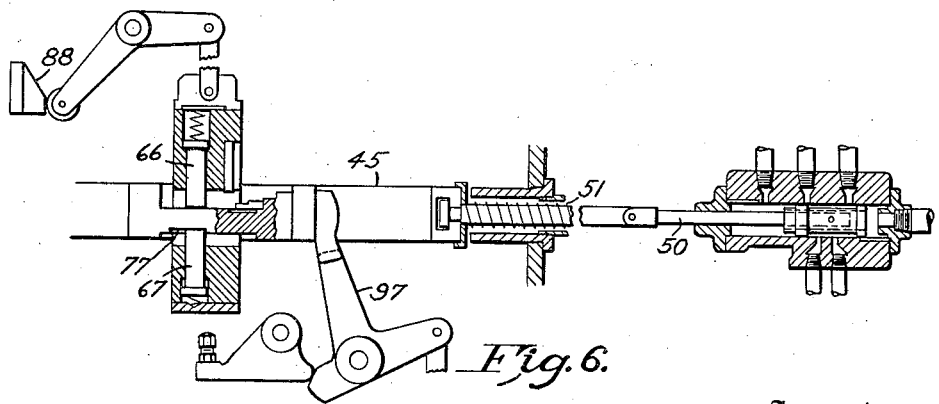

Patented Feb. 13, 1934

1,947,311

UNITED STATES PATENT OFFICE 1,947,311

TRIP MECHANISM FOR HYDRAULICALLY CONTROLLED GEAR UNIT

Robert A. Schafer, Richmond, Ind., assignor to The National Automatic Tool Company, Richmond, Ind., a corporation of Indiana Application September 26, 1930
Serial No. 484,691

16 Claims. (Cl. 60—52).

This invention is concerned with improvements in the controls for machine tools and more particularly to the governing of the hydraulic transmission means as applied thereto.

The efficiency, accuracy and flexibility of many of the major types of machine tools have been greatly enhanced by the general incorporation therein of hydraulics and the continuous changes and improvements as to various features which have been developed as a result of the widespread intensive study devoted to this major phase of machine tool construction.

Such characteristics as flexibility, accuracy and freedom from tool breakage, and the success of hydraulic tools in general, is dependent to a very large extent upon the manner in which it may be controlled, and the present invention is directed to these specific problems.

In response to the demands of the manufacturing industries and through the many ingenious mechanisms developed, machine tools have become more powerful, more rapidly operating, and finally more costly; and breakages of tools and machined parts, as a consequence, have become more difficult to avoid and of greater seriousness.

This invention has, as a major object the provision of an organization so constructed as to greatly reduce such accidents and particularly to eliminate accidents arising from such factors as inattentiveness of the operator, or accidental manipulation of the control means to an untimely or inappropriate position.

The achievement of this is due to a large extent to a system of coordinated elements including a manually operable lever which is effective only in one direction of movement, this direction being the one normally convenient to the operator, the lever being restored to its initial position by elastic means such as a spring or a weight. A particular feature of the invention cooperating with this lever mechanism resides in the function wherein an initial manipulation of the manual lever, preliminary to the beginning of a machine cycle, serves only to position the control mechanism in a neutral position but subjected to an impositively acting force which, upon release of the manual lever, acts to move the control mechanism to a first operative position wherein, in accordance with the normal cycle desired, the translated member typified by a tool head is caused to advance rapidly toward the work. Automatically operating means serve to thereafter cause the completion of the particular cycle desired, consisting, usually, following the rapid advance to the work, of a slow forward working translation, and then a rapid reverse movement to a final retracted position in which the head remains at rest until a new cycle is initiated.

An especial characteristic of the mechanism and operation as thus far noted resides in the fact that no movement of the tool head occurs until the operator releases the manual lever. This is in distinction to the functioning of prior single lever control constructions in which the manual lever is employed to immediately and directly move the control valve means to the position in which the head begins its rapid movement forward. A serious and frequent result in the latter type is that the operator oftentimes has his attention distracted or for some other reason inadvertently holds the lever in rapid forward position for too long a period as a consequence of which the automatic control fails to function to throw the mechanism into the slow feeding movement, and the tools engage the work at a high rate of feed with the costly breakage and damage practically certain to result.

A feature which cooperates with the construction thus far generally referred to and thereby contributes to the achievement of a control which eliminates over-running on the rapid forward movement, is that of a valve operable through a series of successive positions, in a single direction, under the influence of impositive means tending to move the valve from one releasable latched position to another, the valve having a neutral position at the beginning of the series of positions, and a further neutral position at the opposite end of its range of movement following rapid reverse movement of the translated head.

A further major object accomplished by this invention is the elimination of any liability of improper manipulation of the mechanism, particularly in emergency cases. It frequently occurs in a normal operation of the machine that some circumstance arises which renders it necessary that the machine be reversed in its operation and the head be caused to cease forward movement and preferably to move away from the work. In such emergencies it becomes extremely urgent for the operator to reverse the machine as quickly as possible and such action should, as a matter of fact, be capable of being accomplished automatically without the slightest deliberation. In the present construction there is but one lever available and there can be no possible confusion as to which lever to operate. Further, there is but one manner of operating this lever and but one position to which it may be moved at the time that such emergencies arise. The operator, therefore, is not required to move the control lever with deliberation and slow careful observance as to the position necessary to accomplish reversal of the machine.

The present organization is particularly advantageous in this respect and able to accomplish the desired results in that the control lever consists of a foot treadle conveniently located to the operator, the reversal being accomplished by the simple operation of stepping on the treadle and depressing it to its full extent.

Further objects of the invention reside in the simplicity of the construction, an important feature of which is the fact that all the functions are derived from the manipulation of a single lever operable through its complete range of movement for any manual alteration in the cycle desired to be accomplished. The general organization includes a compact, relatively simple system of automatically operating mechanism for shifting the control of the hydraulic transmission through any cycle normally desired in a machine tool. The control mechanism is positive and accurate in its operation and possesses functions rendering it particularly adaptable to the control of a hydraulic transmission of the type employing a selective delivery pump whose characteristics are such as to be more difficult to control than some of the more simpler types of pumps and hydraulic transmissions in general.

This control mechanism includes a novel arrangement of interference means for successively locating and holding the control valve means in the various positions of a cycle. In accordance with the organization provided herein the control means is moved to an initial position where it is under the influence of an impositively acting means, such impositive means serving to thereafter, in combination with the interference means and the automatic control thereof, to progressively move the valve through a series of positions, the entire working cycle, from one neutral position to a second neutral position, being derived from this progressive movement, all in one continuous single direction.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 4:
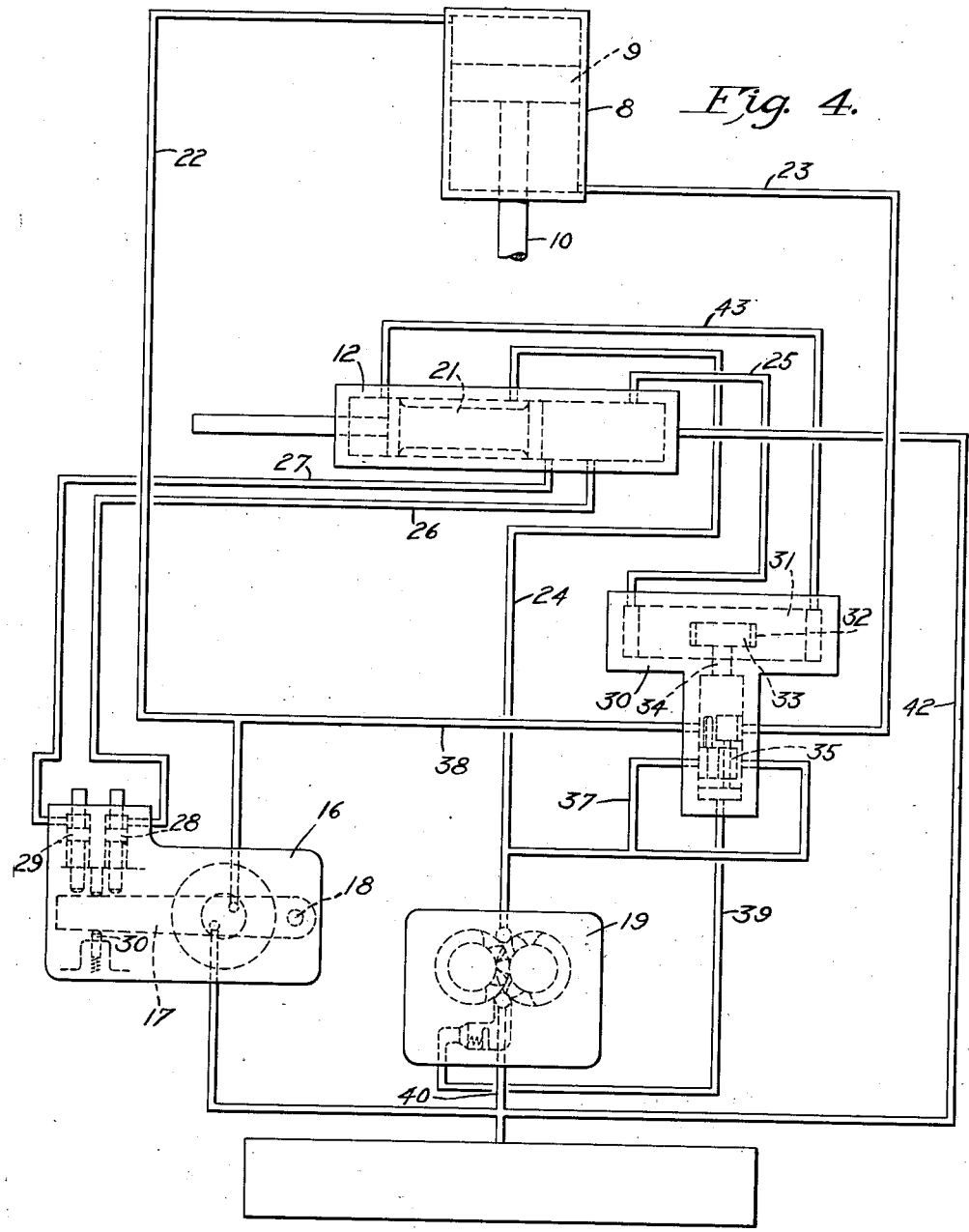
Figure 5:
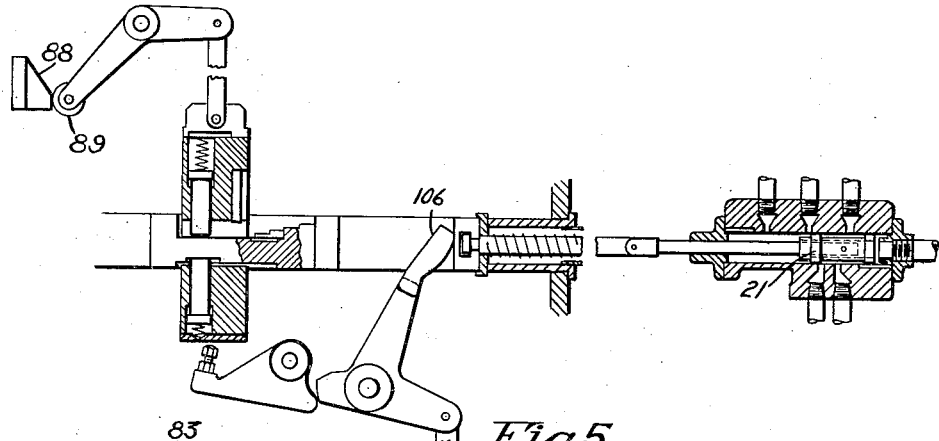
Figure 7:
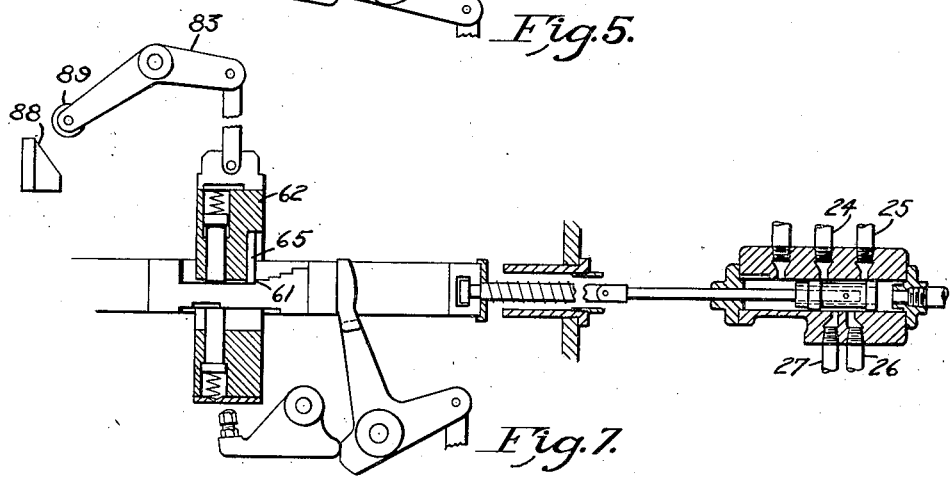
Figure 8:
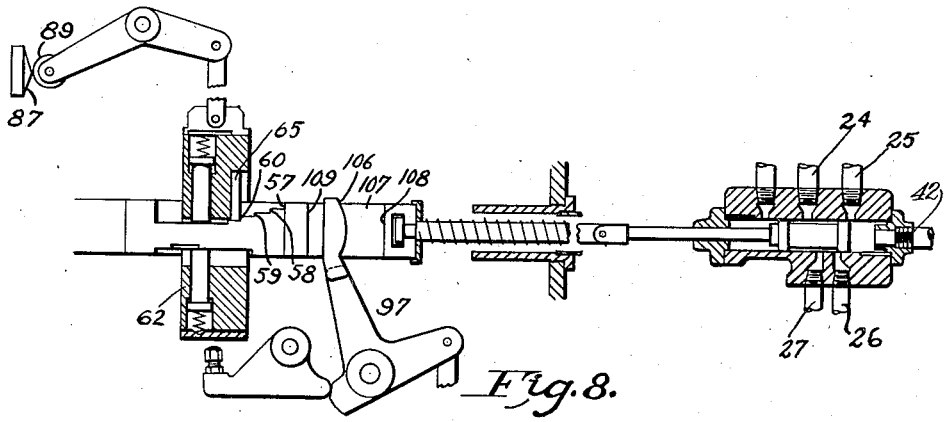

Figure 1 is a side elevational view of a drilling machine having embodied therein the present invention. Fig. 2 is a similar, but fragmentary view, with the cover to the control mechanism casing removed for disclosure of the details therein. Fig. 3 is a detail view of the interference plunger means, shown in Fig. 2, for locating the valve shifting means in successive positions. Fig. 4 is a diagrammatic view of the hydraulic circuit; and Figs. 5 to 10 inclusive are fragmentary views showing successive positions of the valve actuating mechanism, of which Fig. 5 is an initial neutral position, Fig. 6 is a rapid traverse forward position, Fig. 7 is a second rapid traverse forward position, Fig. 8 is a slow forward position, Fig. 9 is a rapid reverse, and Fig. 10 is a final neutral position.

A typical application of the invention is shown in a general manner in Figure 1, the machine there disclosed being a multiple spindle drilling machine consisting of a base 1, a vertical column 2 thereon having a translatable head 3 mounted for translation on the vertical ways 4. Rotation of the several spindles 5 of the head 3 is derived from the electric motor 6 mounted on the head. Translation of the head is accomplished through the medium of a hydraulic transmission which includes a pump 7 supplying hydraulic fluid to a cylinder 8 arranged vertically in the column in which operates a piston 9 having a connection through the piston rod 10 at 11 to the tool head 3. The pump 7 employed in this organization is of a type which is adjustable to deliver selective amounts and in either direction, the control of the pump being accomplished through fluid pressure means which in turn is under the control of the valve means 12 located, in the present case, as shown in Figs. 1 and 2, on the side of the pump casing. Suitable pipe lines connect the valve casing with the mechanism, interior of the pump housing, to produce the variations in rate of discharge and direction in accordance with the position of the valve distributor member.

With the exception of necessary exterior connections the valve control mechanism is all compactly located within the casing 14 shown in Figs. 1 and 2 mounted on the side of the drill column 2.

The control mechanism of this invention presents especial advantages as incorporated in an organization in which the hydraulic transmission means includes a pump of the well known type which is capable of being adjusted to deliver fluid directly to the propulsion motor element at selected rates and in either direction. Although the exact details of such a type pump are not necessary to a disclosure of this invention, the general features of the pump are, for convenience, shown and described herein. The particular pump shown is a commercial product manufactured and sold by The Oilgear Co., of Milwaukee, Wisconsin. The fluid circuits and functioning of the pump apparatus is, in general, as shown in Fig. 4. Further and more specific details of a pump of this type may be obtained by reference to the United States Patent No. 1,685,049 or the British patent to The National Automatic Tool Co., No. 270,715.

In accordance with the complete hydraulic transmission shown in outline in Fig. 2 and diagrammatically in Fig. 4, the interior mechanism of the pump housing includes a radial cylinder reciprocatory piston type of pump 16 in which the pistons are mounted on a pintle connected to the lever 17 pivoted at 18, the rate of discharge of the pump 16 being determined by the position of the lever 17 which in turn determines the eccentricity of the central pintle of the pump 16. A further pump proper is included in the pump housing consisting of the gear pump 19. The pumps 16 and 19 are normally continuously operated, the discharge being so controlled that the low pressure fluid derived from the gear pump at a rapid rate serves to translate the piston 9 and thereby the tool head 3 in rapid forward and rapid reverse movements while the reciprocatory piston pump 16 delivers fluid at a relatively low rate but a high pressure to the upper end of the cylinder 8 during the forward working portion of the cycle and also combines with the discharge of the gear pump during rapid forward movement of the piston and tool head.

For convenience, the exact functioning of the pump will be described through a series of operations, comprising, in the total, a cycle such as would be normally employed in a machine tool of the type disclosed herein. Such functioning occurs as follows: With the valve member 21 in the position shown in Fig. 5 no fluid in either direction is delivered by the selective delivery pump 7 through either pipe 22 or 23 and the piston 9 occupies a retracted position in the upper end of cylinder 8, as shown in Fig. 4. The means for moving the valve member 21 will be subsequently described in detail but for the present the successive positions only of this valve member will be mentioned. The next position of the valve member 21 will be that shown in Figs. 6 or 7 in which position fluid derived from the gear pump 19 passes through the conduit 24 and from there through the valve casing out pipes 25, 26 and 27. Fluid through the pipes 26 and 27 serves to depress the plungers 28 and 29 respectively, which movement in turn swings the lever 17 about its pivot 18 depressing the spring pressed plunger 30 and moving the pintle of the variable displacement pump 16 to an eccentric position in which fluid is delivered through the pipe 22. Fluid through the pipe 25 is delivered to the left end of a cylinder 30 in Fig. 4 which serves to move a piston 31 therein to the right. This piston 31 is connected through a rack 32 to a gear 33, which in turn is integral with a rotary shaft 34 carrying a rotary valve 35. When the piston 31 is moved to the right the rotary valve 35 is so positioned that fluid from the gear pump 19 passes through the pipe 37 and through the rotary valve 35 to the pipe 38 where it combines with the discharge from the pump 16 and is delivered to the upper end of the cylinder 8 to cause rapid forward movement of the piston 9. Exhaust from the lower end of cylinder 8 during this period passes through the pipe 23 through passages in the rotary valve 35 and out the pipe 39 to the intake of the gear pump 19 or to exhaust through the pipe 40. For the present it may be noted that the functioning is the same for the positions of Figs. 6 and 7.

The next succeeding position of the valve is that shown in Fig. 8. In this position pressure fluid is shut off from the pipe 25 and both ends of the casing 30 are connected to the exhaust through pipe 42, the right end of casing 30 being connected thereto through the pipe 43 through the hollow interior of the valve member 21 and the pipe 42. The rotary valve piston 31 is provided with means for causing it to return to the mid-position when exposed to equal pressures on its opposite ends, such means consisting of, e. g. opposed springs. With the rotary valve 35 in this mid-position the pipe 38 is closed off and high pressure fluid is developed and delivered through the pipe 22 to the upper end of the cylinder 8 to cause it to advance under high pressure on its working stroke. Exhaust from the lower end of cylinder 8 occurs through pipe 23, passages in the valve 35 and out the pipe 39. In the present disclosure both pipes 26 and 27 at this time are exposed to the pressure fluid from the gear pump and thereby both plungers 28 and 29 are forced to their extreme inward position against the lever 17. However, it may be readily seen that these pipes may be closed off successively and two different rates of flow feed be obtained depending upon the extent of movement which the respective plungers 28 and 29 give to the lever 17.

Following the slow feed movement of the piston during the working stroke the valve member 21 is moved to the position shown in Fig. 9, in which position fluid is delivered from the gear pump 19 through the pipe 43 to the right end of valve operating cylinder 30, shifting the rotary valve 35 in the opposite direction and directing the discharge from the gear pump 19 through the pipe 23 to the lower end of cylinder 8. At this time the plungers 28 and 29 are relieved of pressure, the pipes 26 and 27 being connected to the exhaust pipe 42 and the lever 17 moves to its mid-position wherein no discharge occurs from the pump 16, the pipe 38, in fact, being connected through the rotary valve 35 directly to the pipe 39 through which fluid from the upper end of the cylinder is discharged to the exhaust. The above operation, of course, results in the rapid traverse reverse of piston 9.

The final position of the cycle is shown in Fig. 10 which is a neutral position and in which position the functioning of the pump is exactly the same as when the valve is in the position of Fig. 5. In both these positions it will be observed that the pipe 24, and thereby the gear pump, is open to the exhaust through the pipe 42, that no pressure is exerted on the plungers 28 and 29 of the piston pump nor on the opposite ends of the piston 31 connected to the rotary valve 35 and the main power piston 9 remains in a retracted upper position.

Having described the functioning of the hydraulic transmission in the various positions of the valve member 21, the specific features of the valve actuating mechanism, to which this invention more directly relates, will now be described. A major element of this actuating mechanism is the slide member 45 movable in the bore 46 of the bracket 47 integrally cast within the casing 14. The slide bar 45 has a flexible connection with a rod 48 which in turn is jointed at 49 to the stem 50 of the valve member 21. The slide bar 45 is normally urged to the left in Fig. 2 through an impositive means herein disclosed as a spring 51 suspended between the end 52 of the slide bar 45 and the outer bearing cap 53 secured on the tubular casing 54 projecting from the housing 14.

The slide bar 45 has a cutaway portion 56 which is so formed as to present shoulders 57, 58, 59, 60 and 61 adapted to engage with a transversely movable plunger 62 and thereby form interference means for restraining the movement of the slide bar from its tendency to move to the left in various successive positions, dependent upon the position of the plunger 62.

The plunger 62 is slidable in the vertical bore 63 of the bracket 47 and has a transverse opening 64 therein through which operates the slide bar 45. The plunger 62 has a wear-plate 65 adapted to be engaged by the various shoulders 57 to 61 inclusive of the slide bar 45.

Auxiliary interference means, for a purpose to be hereinafter described, are associated with the plunger 62, such auxiliary means comprising opposed latch bolts 66 and 67, the upper one of which is urged inwardly by a spring 68 received within the hollow bore of the bolt 66, the outer end of the spring 68 bearing against a plate 69 secured to the upper surface 70 of the plunger 62. A similar spring arrangement is provided in connection with the latch bolt 67, the outer end of spring 73 therefor bearing against a plate 74, secured to the lower end of plunger 62. Each of the latch bolts is provided with an outer annular shoulder 76 adapted to be engaged by the shoulders in the plunger 62 resulting from the reduced portion of the diameter in which the latch bolts operate. The lower plunger 67 is adapted, as shown in Fig. 6, to engage in a recess 77 of the latch bar 45 and upper latch bolt 66 to engage in a recess 78 on the upper face of the slide bar 45, as shown in Fig. 9.

Various means for the complete operation of the interference plunger 62 are provided. It may be noted, first of all, that the plunger is normally urged downwardly by means of the compression spring 80 enclosed in the housing 81 attached to the main casing 14 of the actuating mechanism. Automatic movement of the plunger 62 in an upward direction, in accordance with the movement of the machine tool head 3, is accomplished through the means of a link 82 pivoted to the upper end of plunger 62, the opposite end of link 82 being attached to a bell crank 83, pivoted to the drill column at 84. The slidable head 3 has adjustably mounted thereon a series of dogs 85, 86, 87 and 88, which successively engage a roller 89 carried by the arm 90 of the bell crank 83.

A further means for shifting the plunger 62 a limited distance, in which the slide bar 45 is permitted to move to the left an amount sufficient to move the control valve to the reverse position, is also provided, such means including the lever 92 pivoted at 93 in the casing 14. As shown in Fig. 2 e. g. the outer left end of this lever carries an adjustable set screw 94 engageable with the bottom plate 74 of the plunger 62. The lever 92 is also provided with a cam portion 95 coacting with a cam 96 carried by the three-fingered bell crank 97.

The manual control for the valve actuating mechanism consists of a foot treadle 98, pivoted at 99 in the machine tool base 1 in a position convenient to the operator. Integral with the treadle 98 is a projecting arm 100 to which is pivoted a link 101, in turn pivoted to bell crank 102 pivoted at 103 on the base of the machine. A vertical link 104 connects one arm of the bell crank 102 to one of the arms of the three-armed bell crank 97. The upper end of the vertically extending arm of the bell crank 97 is divided to provide a forked portion 106 encompassing a flat portion 107 of the slide bar 45. The fork 106, in its movement about its pivot, is adapted to engage projecting shoulders 108 or 109 of the slide bar 45 and accordingly shift the slide bar 45. Impositive means, such as the weight 110, are provided for normally maintaining the treadle 98 in its upper position, as shown in Fig. 1.

Having described the structural details exemplifying this invention, the functions thereof will be more clearly disclosed through the medium of a description of a cycle typical of the operation which the present invention is adapted to provide.

In Fig. 5 the mechanism is shown in an initial neutral position at the beginning of a cycle. In this position the roller 89 has been engaged by the dog 88 upon the head having been moved to its extreme upper position at the completion of the last previous cycle. To initiate a new cycle the operator steps on the treadle 98 which swings the fork 106 to the right in Fig. 5, moving the slide bar 45 and the valve member 21 to the position there shown. In accordance with the position of the elements shown in this Fig. 5, the operator still has his foot on the treadle 98. As previously described, the valve in Fig. 5 occupies a neutral position and the head 3 still remains at rest.

The next succeeding positions of the valve mechanism are shown, in accordance with the normal operation, in Figs. 6 and 7. First in Fig. 6 the operator has removed his foot from the treadle 98 and bell crank 97 swings into the position shown therein and the slide bar 45, under the influence of the loaded spring 51, moves to the left until stopped by engagement of latch 67 in the recess 77. In accordance with the position of the valve shown in Fig. 6, fluid is now supplied to the upper end of cylinder 8 at a rapid rate and the head rapidly advances toward the tool. Immediately that the dog 88 clears the roller 89, bell crank 83 is swung to the position shown in Fig. 7 and plunger 62, under the influence of spring 80, is permitted to move downwardly a limited distance sufficient to cause annular shoulder 76 of the latch bolt 67 to be engaged and withdraw it from the recess 77, permitting the slide bar 45 to move to the left until wear-plate 65 is engaged by shoulder 61 as shown in Fig. 7. No change in functioning of the hydraulic transmission occurs as a result of this additional movement, it being apparent that the position of valve member 21 with respect to the various parts is subs'antially the same in Fig. 7 as in Fig. 6. It will be seen that the latch bolt 67 remains in recess 77 upon downward movement of plunger 62 when released from dog 88 until the plunger 62 has moved downwardly far enough to ensure that shoulder 61 of slide bar 45 will engage wear plate 65 of plunger 62. The arrangement constitutes a safety device eliminating any possibili'y of the slide bar 45 jumping too far to the left because of any sluggishness in the downward movement of plunger 62.

The next change in the cycle occurs when roller 89 is engaged by dog 87 in the downward movement of the head. At this time it is to be assumed that the tools have reached the workpiece and a slow downward traverse at a high pressure is desired. Engagement of roller 89 by dog 87 serves to lift the plunger 62 a sufficient amount to permit slide bar 45 to move to the left until shoulder 60 engages plate 65 and the valve member 21 occupies the position shown in Fig. 8 in accordance with which, as previously described, the fluid is supplied to the upper end of the driving cylinder 8 at a slow rate and under high pressure.

Under certain conditions another feed may be desired which is different as to rate from that which would be produced from the position of the mechanism shown in Fig. 8. In that case the next succeeding valve position would be that produced when dog 86 engaged roller 89 and assuming the dog 86 to be somewhat longer than dog 87 the latch mechanism would be elevated sufficiently to permit the shoulder 59 on slide bar 45 to engage the wear plate 65. Conduit 26 to the control plunger 28 of the pump would then be closed off and the pump would supply fluid under high pressure for feeding but at a different rate dependent upon the adjustment of plunger 29 only. It will be that one or the other of the dogs 87 or 86 can be omitted if desired with the omission of its function, and various adjustments to the pump controls be made in accordance with speed and number of feeds desired.

The slow downward feed continues until dog 85 engages roller 89 and lifts the plunger 62 a sufficient distance to permit the slide bar 45 to shift to the left until shoulder 58 engages the wear-plate 65 and the valve is restrained in the position of Fig. 9. In this position the hydraulic transmission is reversed and fluid is supplied to the lower end of main cylinder 8 at a rapid rate to cause the drill head 3 to move upward, which movement continues until dog 88 again engages roller 89, as shown in Fig. 10, and plunger 62 is lifted a sufficient amount to permit the slide bar 45 to move to the position shown in Fig. 10, in which shoulder 57 thereof engages the wear-plate 65. The valve member 21 is now in a second or final neutral position in which the head remains at rest in its retracted position until the initiation of a new cycle by the depressing of the foot treadle 98.

It will be observed that a complete cycle is derived from a continuous movement to the left of the slide bar and the connected valve member 21 under the influence of the spring 51. Each successive position is accurately and positively determined by the engagement of the stepped cam or shoulder means of slide bar 45 with the interference plunger 62. The valve member has a neutral position at both ends of its range of movement and to bring the tool to rest it is not required that the valve means be moved back through a series of its operative positions with the disturbance of the cycle liable to occur from such an operation, particularly if such reverse movement is accomplished by a slow acting cam means with a possible delay at some of the intermediate operative positions of the valve.

A further feature in the functioning and operation of this mechanism of great importance relates to the emergency means for reversing the machine tool at any time that such operation becomes necessary or desirable. One typical instance, of course, in which it suddenly may become necessary to stop and/or reverse the machine, is that when some accident occurs such as the breakage of a tool or the engagement of some foreign object in the machine. In such case, all that is necessary is for the operator to step on the treadle 98 which swings the bell crank 97 in a clockwise direction. As shown in Fig. 9, engagement of the cam surface 96 thereof with the cam portion 95 of the lever 92 moves plunger 62 upward and thereby releases slide bar 45 to permit it to move to the position shown in Fig. 9 in which shoulder 58 engages with wear-plate 65. It will be seen that the lever 92 does not shift plunger 62 to its extreme upper position but only an amount sufficient to allow the slide bar 45 to move to the reverse position by reason of the fact that cam 96 on bell crank 97 slips past the cam 95 of lever 92. It may also be noted that latch bolt 66 engaging in the recess 78 of slide bar 45 prevents subsequent movement of the slide bar 45 to the right as a result of continued depression of treadle 98. Summing up the operation, particularly with respect to the movement of the slide bar 45, assuming that the head is moving downward and at any point in its downward movement, either rapid traverse or slow feed, the operator, upon the arising of an emergency, steps on the treadle 98, the slide bar 45 is then first released and permitted to jump to the left to the position shown in Fig. 9, thereafter the fork 106 engages the shoulder 108 but further movement of the slide bar 45 to the right is prevented by engagement of latch bolt 66 in the recess 78, as previously described. The head therefor proceeds on its reverse movement and the next change in the cycle is accomplished automatically by the dog 88 engaging roller 89 and moving the valve to the neutral position of Fig. 10, exactly as the machine operates during a normal cycle. If treadle 98 is depressed during reverse movement such has no effect since, as shown in Fig. 9, latch bolt 66 at this time projects into recess 78 and cam 96 is not of sufficient extent to further lift plunger 62.

It will be noted that the sole manual control is derived from downward movement of the treadle 98. To start a cycle the depression of the treadle 98 serves only to shift the valve to the neutral position shown in Fig. 5 and downward movement of the head does not begin until the operator has released the treadle 98. In distinction to this operation it is desired to call attention to the fact that if the downward movement of the lever 98 served to start the movement of the head 3 immediately that the operator, for some reason, might fail to remove his foot from the treadle and as a consequence the tools 5 would engage the work at a rapid rate with the consequent costly breakage ensuing therefrom. Like damage naturally would occur in the event that the manual lever were accidentally displaced by engagement thereof by some foreign object.

The same lever is employed in an advantageous manner, at any time after the beginning of a cycle, to throw the mechanism to reverse position. No confusion can possibly arise, such as grasping of the wrong control, the only possible operation being the depression of foot treadle 98 which, subsequent to the initiation of the cycle, necessarily causes immediate stopping of the head in its forward movement and the reversal thereof. No deliberation is required, nor any confusion likely to arise as to any manual operation, in fact, since in each case the manipulation is simply a complete depression of the treadle.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States.

1. A machine tool combining a frame; a head translatably mounted thereon; a hydraulic transmission for translating said head; control valve means therefor; manually shiftable means operable in an extreme positively limited point of movement to locate said valve means in a neutral position wherein said transmission is ineffective to translate said head; and means automatically operable upon release of said manual means to move said valve to an operative position wherein said transmission is effective to translate said head.

2. A machine tool combining a frame; a member translatably mounted thereon; a hydraulic transmission for translating said member; valve means therefor for controlling forward and reverse movements of said member; impositive means for urging said valve means in one direction; manual means operable through a limited range and effective at an extreme position thereof to shift said valve means to a neutral position, said valve means being moved to an initial operative position upon release of said manual means; and means for shifting said valve means to a reverse position from any position thereof in its cycle by movement of said manual means to an extreme position subsequent to said release.

3. A machine tool combining a frame; a head translatably mounted thereon; a hydraulic transmission for translating said head; control means therefor; manually operable means for shifting said control means to an extreme positively limited position in one direction and constituting a neutral position wherein said transmission is ineffective to translate said head; impositive means acting upon said control means tending to urge it in a direction opposite to said manual means and operative upon said control means to shift it to an operative position upon release of said manual means wherein said hydraulic transmission is rendered effective.

4. A machine tool combining a frame; a member translatably mounted thereon; a hydraulic transmission for translating said member; control valve means therefor; impositive means for urging said valve means in one direction; interference means for locking said valve means in successive operative positions against the force of said impositive means; manually operable means for shifting said valve against the force of said impositive means, said valve means being movable by said manual means in its extreme operation to a neutral position and upon release of said manual means movable by said impositive means to an initial operative position.

5. A machine tool combining a frame; a member translatably mounted thereon; a hydraulic transmission for translating said member; valve means therefor to control the forward and reverse movement of said member; a manually operable means to shift said valve means to neutral position upon movement of said manual means to its extreme position; means to move said valve upon release of said manual means to an initial operative position; and means cooperating with said manual means whereby subsequent movement of the manual means shifts said valve to reverse position.

6. A machine tool combining a frame; a head translatably mounted thereon; a hydraulic transmission for translating said head; valve means therefor for controlling forward and reverse movements of said head; a foot treadle; connections therefrom for shifting said valve means to a neutral position upon complete depression of said treadle; means for automatically moving said valve means to an operative position upon release of said treadle; means for operating said valve means through a cycle; and means adapted to be actuated by complete depression of said treadle at any point in said cycle for causing said valve means to be moved to reverse position.

7. Valve actuating mechanism for fluid pressure transmissions combining a slidable member adapted to be connected to the valve; impositive means tending to slide said member in one direction; manually operable means for shifting said member in the opposite direction; a plunger movable transversely thereto having a surface interengageable with surfaces on said member to restrain the latter in predetermined positions dependent upon the position of said plunger; and latch means mounted on and carried by said plunger and bodily shiftable therewith, said latch means also being interengageable with surfaces on said member to restrain the latter in one or more additional predetermined positions.

8. Valve actuating mechanisms for fluid pressure transmissions combining a slidable member adapted to be connected to the valve; impositive means tending to slide said member; a plunger adjacent to and slidable transversely to said member; interengaging surfaces between said plunger and member for releasably restraining said member in predetermined positions dependent upon the position of said plunger; and two spring pressed latches mounted on and carried by said plunger and bodily shiftable therewith, said latches also being engageable with surfaces on said member to releasably restrain the latter in predetermined positions.

9. A hydraulic transmission; a member connected to be translated thereby; control means for said transmission to cause forward and reverse movements of said member; and mechanism for actuating said control means comprising a shiftable member, impositive means for urging said member in one direction, interference means for releasably restraining said member in successive forward and reverse positions, a manually operable lever, connections therefrom for placing said member in an initial position under the force of said impositive means, pivoted cam means associated with said interference means, and means for temporarily operating said cam means by movement of said lever to its extreme position to operate said interference means to permit said member to move to reverse position.

10. A hydraulic transmission having a control valve means; a member translatable by said transmission in forward and reverse directions; and means for actuating said valve means comprising impositive means for urging said valve means in one direction, interference means for releasably restraining said valve means in predetermined positions including a reverse position against the force of said impositive means, a single manually operable lever, connections from said lever for moving said valve means in a direction opposed to said impositive means, and connections from said lever for operating said interference means to an extent to permit said valve means to move to said reverse position.

11. A hydraulic transmission having a control valve means; a member connected to be translated by said transmission in forward and reverse directions; and means for actuating said valve means comprising impositive means for urging said valve means in one direction, interference means for releasably restraining said valve means in successive operative positions against the force of said impositive means, a single manually operable lever, connections therefrom for moving said valve in a direction opposed to said impositive means, and connections from said lever for operating said interference means.

12. A hydraulic transmission; a member connected to be translated thereby; control means for said transmission to cause forward and reverse movements of said member; and mechanism for actuating said control means comprising a shiftable member; impositive means for urging said member in one direction, interference means for releasably restraining said member in successive forward and reverse positions, a manually operable lever, connections therefrom for moving said member to an initial position opposed to said impositive means, and cam means operable by said lever in its extreme movement to operate said interference means to permit said member to move to the reverse position.

13. A hydraulic transmission; a member connected to be translated thereby; control valve means for said transmission; and means for actuating said valve means to control the cycle of said member comprising impositive means for urging said valve means in one direction, interference means for releasably restraining said valve means in successive forward and reverse positions, manually operable means for moving said valve means to an initial position, and cam means operable by said manual means to actuate said interference means to permit said valve means to move to the reverse position.

14. Control mechanism for power transmissions comprising a shiftable control member; impositive means for urging said member in one direction; interference means for locking said control member in successive operative positions against the force of said impositive means in accordance with the cycle of the power transmission; manually operable means for shifting said control member against the force of said impositive means, said control member being movable by said manual means in its extreme operation to a predetermined unlatched position and upon release of said manual means movable by said impositive means to an initial latched operative position of the transmission cycle.

15. A machine tool combining a frame; a member translatably mounted thereon; power transmission for translating said member in accordance with a working cycle; control means therefor having operative positions for forward and reverse movements of said member; an actuating element for said control means; manually operable means to shift said element to a neutral position of said control means upon movement of said manual means to its extreme position; means to automatically move said element to an initial operative position of said control means upon release of said manual means; and means cooperating with said manual means whereby subsequent movement of said manual means during the succeeding cycle shifts said element to a reverse position of said control means.

16. A machine tool combining a frame; a member translatably mounted thereon; a power transmission for translating said member in accordance with a working cycle; control means for said transmission; an actuating element for said control means; impositive means for urging said element in one direction; interference means for releasably restraining said element in successive operative positions of said control means against the force of said impositive means; a single manually operable lever; connections therefrom for moving said element in a direction opposed to said impositive means; and connections for operating said interference means from said manual lever.

ROBERT A. SCHAFER.